United States Patent Office 3,411,990
Patented Nov. 19, 1968

3,411,990
PROCESS FOR PRODUCING L-GLUTAMIC ACID
Kiyoshi Udagawa, Yoyohama, and Mamoru Kohata, Kawasaki-shi, Japan, assignors to Kyowa Hakko Kogyo Co., Ltd., Tokyo, Japan, a corporation of Japan
No Drawing. Filed Dec. 16, 1965, Ser. No. 514,399
Claims priority, application Japan, Dec. 18, 1964, 39/71,029
13 Claims. (Cl. 195—47)

ABSTRACT OF THE DISCLOSURE

A process for producing L-glutamic acid by fermentation which comprises culturing a hydrocarbon non-assimilatory L-glutamic acid-producing microorganism under aerobic conditions in an aqueous nutrient medium containing carbohydrates or organic acids as the main carbon source and also containing at least one hydrocarbon, the latter serving to eliminate the hindrance of the fermentation which is caused by biotin and biotin-active substances.

---

This invention relates to a process for producing L-glutamic acid. More particularly, it relates to a process for the production of L-glutamic acid by fermentation. Even more particularly, the invention relates to a process for the production of L-glutamic acid by fermentation with microorganisms from carbohydrates or organic acids in the presence of hydrocarbons.

It is well known (Japanese patent 263,709) that remarkably large amounts of L-glutamic acid are accumulated in fermentation methods for producing L-glutamic acid from carbohydrates or organic acids when the content of biotin and biotin-active substances is employed and controlled in a suboptimal level which is less than that required for the maximum growth of L-glutamic acid producing microorganisms. On the other hand, the production of L-glutamic acid is inhibited when the content of biotin and biotin-active substances is employed in a higher level than that required for the maximum growth of the microorganisms. In the latter case, L-glutamic acid is scarcely accumulated.

Moreover, there is the problem that in the industrial production of L-glutamic acids by fermentation the use of relatively inexpensive raw materials, for example, carbohydrates such as sweet potato molasses, beet molasses, raw sugar, starch saccharified liquor and the like, or impure organic acids such as acetic acid, citric acid, lactic acid, keto acids and the like, as the carbon source significantly inhibits the fermentation because of the impurities in these materials. There are several reasons why the use of such raw materials inhibits the fermentation process for producing L-glutamic acid. One of the most significant of these reasons is the influence of biotin and biotin-active substances on the fermentation process when they are present in the culture medium in a higher level than that required for the maximum growth of the producing microorganisms.

On the industrial scale, various methods have been proposed for overcoming the inhibition of L-glutamic acid fermentation, referred to above. These involve culturing in the presence of antibiotics (Japanese Patent No. 1,695/1962), growth inhibitory drugs (Japanese Patent No. 5,450/1964), and surface active agents (Japanese Patent Nos. 8,798/1965 and 14,559/1965).

One of the objects of the present invention is to provide an improved process for the preparation of L-glutamic acid which overcomes the inhibition of the fermentation encountered in the prior art methods.

Another object of the present invention is to provide a process for producing L-glutamic acid by fermentation which may be carried out in an efficacious and simple manner.

A further object of the invention is to provide a process for preparing L-glutamic acid by fermentation which gives the product in good yield.

A still further object of the invention is to provide a process for producing L-glutamic acid by fermentation which may be carried out advantageously on an industrial scale to give a high yield of product.

These and other objects and advantages of the present invention will become apparent to those skilled in the art from a consideration of the following specification and claims.

In accordance with the present invention, it has been found that the above-mentioned disadvantages may be eliminated and the production yield of L-glutamic acid may be increased by adding hydrocarbons to the culture medium. Thus, by employing the method of the present invention, it is possible not only to use relatively inexpensive raw materials but also to obtain a high yield of product. Therefore, the method of the present invention is advantageous as an industrial production method.

Amino acid fermentation by the use of hydrocarbon-assimilatory microorganisms is known [Agricultural and Biological Chemistry, volume 27, No. 5, 390–395 (1963)]. However, the microorganisms employed in the present invention are hydrocarbon non-assimilatory L-glutamic acid-producing microorganisms.

Hydrocarbons which may be employed in the process of the present invention include straight- and branched-chain paraffins (alkanes), cycloparaffins, straight- and branched-chain olefins, cycloolefins, aromatic hydrocarbons such as benzene, xylene, etc., and mixtures thereof and mixed hydrocarbons such as kerosene, light oils, paraffin oils, etc. The amount of hydrocarbon to be employed varies in accordance with the particular hydrocarbon which is utilized, but it has been found that 0.05 to 5% by weight of hydrocarbon may be employed in the culture medium at the beginning of the fermentation. On the other hand, partial amounts or the whole amount of the hydrocarbon(s) may be added during the fermentation either all at one time or intermittently.

The composition of the culture medium and the conditions of culturing are conventional and well known in the art of fermentation. Thus, either a synthesized culture medium or an organic culture medium is employed as long as it contains the essential nutrients for the growth of the microorganisms employed. Such nutrients are well known in the art and include substances such as a carbon source, a nitrogen source, mineral salts, vitamins and the like which are utilized by the L-glutamic acid producing microorganisms. Thus, as a carbon source, there may be mentioned, by way of example, carbohydrates such as glucose, sucrose, starch hydrolysate solution, molasses, etc., and organic acids such as acetate, keto acids, etc., and the like. As a nitrogen source, various kinds of inorganic or organic salts or compounds such as ammonia, ammonium sulfate, ammonium chloride, ammonium nitrate, urea, etc., or other compounds containing nitrogen, such as peptone, N-Z-Amine (trademark for a series of casein hydrolysates), meat extract, corn-steep liquor, casein hydrolysate, fish meal, etc., may be employed. Furthermore, as a vitamin source, biotin, yeast extract, etc., may be employed. Mineral salts which may be added to the culture medium include potassium dihydrogen phosphate, potassium monohydrogen phosphate, magnesium sulfate, ferrous sulfate, manganese sulfate, etc.

The following examples are given merely as illustrative of the present invention and are not to be considered as limiting. Unless otherwise noted, the percentages therein are by weight.

After the completion of fermentation, the L-glutamic acid may be separated from the fermentation filtrate by conventional means, such as ion exchange resin treatment, concentration, or the like.

EXAMPLE 1

A seed medium is made up consisting of 2% of glucose, 1% of peptone, 0.5% of meat extract and 0.25% of sodium chloride. The pH of the seed medium is 6.8–7.0.

Two fermentation media are prepared. The first, fermentation medium A, consists of 10% of glucose, 0.1% of ammonium sulfate, 0.05% of potassium dihydrogen phosphate, 0.05% of dipotassium hydrogen phosphate, 0.03% of magnesium sulfate, 0.001% of manganese sulfate, 0.001% of ferrous sulfate, 0.5% of urea (separately sterilized) and 20 μg./l. of biotin. The second, fermentation medium B, consists of 10% of molasses (as the reduced sugar), 0.1% of ammonium sulfate, 0.05% of potassium dihydrogen phosphate, 0.05% of dipotassium hydrogen phosphate, 0.01% of magnesium sulfate and 0.5% of urea (seperately sterilized).

*Micrococcus glutamicus* No. 560 (ATCC 13761) is seed cultured in the above-mentioned seed medium. The seed culture is inoculated in the ratio of 0.5% by weight into 250 ml. conical flasks, each containing 20 ml. of fermentation medium A or 20 ml. of fermentation medium B, respectively. The flasks also contain the hydrocarbons listed in Table 1 below in the amounts shown. During the subsequent fermentation, the pH of the fermentation medium is maintained at from 6–9 by adding a 20% aqueous urea solution thereto. Shaking of the culture is carried out at 220 r.p.m. and a temperature of 30° C. The results of the analyses at the completion of fermentation, after 50 hours of culturing, are shown in Table 1.

TABLE 1

| Hydrocarbon | | Amount of L-glutamic acid produced (mg./ml.) | |
|---|---|---|---|
| Type | Amount added percent by weight | Fermentation Medium A | Fermentation Medium B |
| Normal-pentane | 2 | 8.1 | 7.3 |
| Normal-octane | 2 | 15.2 | 13.0 |
| Normal-decane | 2 | 16.5 | 15.7 |
| Normal-dodecane | 2 | 17.0 | 16.2 |
| Normal-hexadecane | 2 | 17.9 | 15.4 |
| Iso-pentane | 2 | 13.3 | 10.2 |
| Iso-octane | 2 | 15.5 | 13.8 |
| Pentene-2 | 2 | 10.1 | 8.8 |
| Mixture of octene-1 and octene-2 | 2 | 9.3 | 11.3 |
| Hexene-1 | 2 | 9.0 | 8.0 |
| Octene-1 | 2 | 11.0 | 9.1 |
| Octadecyne-1 | 2 | 16.2 | 18.0 |
| Cyclohexane | 2 | 13.7 | 10.5 |
| Cyclooctane | 2 | 14.3 | 12.5 |
| Kerosene | 2 | 11.1 | 9.0 |
| Do | 3 | 23.0 | 20.6 |
| No addition | | 0.6 | 2.3 |

EXAMPLE 2

The same culture as set forth in Example 1 is carried out with *Micrococcus glutamicus* strain No. 534 (ATCC 13032). Hydrocarbon is added thereto after 6 hours of culturing. The results obtained after the completion of fermentation, after 48 hours of culturing, are shown in Table 2.

TABLE 2

| Hydrocarbon | | Amount of L-glutamic acid produced (mg./ml.) | |
|---|---|---|---|
| Type | Amount added percent by weight | Fermentation Medium A | Fermentation Medium B |
| Kerosene | 3 | 8.7 | 10.5 |
| No addition | | 1.0 | 4.0 |

EXAMPLE 3

The same microorganism, *Micrococcus glutamicus* strain No. 560 (ATCC 13761), and seed culture medium as shown in Example 1 are employed. 100 liters each of fermentation media A and B, respectively, are put into 200 ml. fermentation vessels, and 10 liters of seed culture liquor are inoculated into each of these vessels. Fermentation is then carried out at an aeration rate of 50 liters of air per minute, a shaking of 200 r.p.m. and a temperature of 30° C. Hydrocarbon is added thereto after 10 hours of culturing. The results after 50 hours of culturing, i.e., at the completion of the fermentation, are shown in Table 3.

TABLE 3

| Hydrocarbon | | Amount of L-glutamic acid produced (mg./ml.) | |
|---|---|---|---|
| Type | Amount added (percent by weight) | Fermentation Medium A | Fermentation Medium B |
| Kerosene | 4 | 42.0 | 33.5 |
| No addition | | 0.5 | 3.1 |

EXAMPLE 4

A fermentation medium containing 3.85% of ammonium acetate (3% as acetic acid), 0.1% of ammonium sulfate, 0.05% of potassium dihydrogen phosphate, 0.05% of dipotassium hydrogen phosphate, 0.03% of magnesium sulfate, 0.001% of manganese sulfate, 0.001% of ferrous sulfate, 20 μg./l. of biotin and 2.5% of kerosene is prepared.

The same strain and seed medium as described in Example 1 are employed. A seed culture liquor is prepared and 5% thereof is inoculated into the above-mentioned fermentation medium. Fermentation is then carried out under the same culturing conditions as set forth in Example 1. The pH during the fermentation is maintained within a range of 6–8 by adjusting with an acetic acid acidic ammonium acetate solution in which the total amount of acetic acid is maintained at 10%. The results after the completion of fermentation (48 hours of culturing) are shown in Table 4.

TABLE 4

| Hydrocarbon | | Amount of L-glutamic acid produced (mg./ml.) |
|---|---|---|
| Type | Amount added (percent by weight) | |
| Kerosene | 2.5 | 20.1 |
| No addition | | 0.9 |

EXAMPLE 5

The same strain and culture as set forth in Example 1 are employed. Two kinds of aromatic hydrocarbon are added thereto after 8 hours of culturing. The results obtained after the completion of fermentation, after 48 hours of culturing, are shown in Table 5.

TABLE 5

| Hydrocarbon | | Amount of L-glutamic acid produced (mg./ml.) | |
|---|---|---|---|
| Type | Amount added (percent by weight) | Fermentation Medium A | Fermentation Medium B |
| Benzene | 1 | 7.5 | 9.6 |
| O-xylene | 0.5 | 12.3 | 10.5 |
| No addition | | 0.3 | 0.8 |

Although certain types of hydrocarbons and microorganisms have been specifically shown in the above examples, it is to be understood that the present invention is applicable to all suitable L-glutamic acid-producing microorganisms. Accordingly, the process of the present invention can be generally employed in L-glutamic acid fermentation processes.

The invention being thus described, it will be obvious that the same may be varied in many ways. Such variations are not to be regarded as a departure from the spirit and scope of the invention and all such modifications are intended to be included within the scope of the following claims.

What we claim is:

1. A process for producing L-glutamic acid which comprises culturing a hydrocarbon non-assimilatory L-glutamic acid-producing microorganism under aerobic conditions in an aqueous nutrient medium containing (1) as the main carbon source a carbohydrate or an organic acid and (2) at least one hydrocarbon.

2. The process of claim 1, wherein said hydrocarbon is kerosene.

3. The process of claim 1, wherein said hydrocarbon is a paraffin.

4. The process of claim 1, wherein said hydrocarbon is a cycloparaffin.

5. The process of claim 1, wherein said hydrocarbon is an olefin.

6. The process of claim 1, wherein said hydrocarbon is a cycloolefin.

7. The process of claim 1, wherein said hydrocarbon is a benzene.

8. The process of claim 1, wherein said hydrocarbon is an o-xylene.

9. The process of claim 1, wherein said microorganism is *Micrococcus glutamicus*.

10. The process of claim 1, wherein said hydrocarbon is employed in amounts of from approximately 0.5 to 5% by weight.

11. A process for producing L-glutamic acid which comprises culturing a hydrocarbon non-assimilatory L-glutamic acid-producing microorganism under aerobic conditions in an aqueous nutrient medium containing (1) as the main carbon source a carbohydrate selected from the group consisting of molasses, glucose, sucrose and starch or an organic acid selected from the group consisting of acetic acid, citric acid, lactic acid and keto acids and (2) about 0.5 to 5% by weight of at least one hydrocarbon.

12. The process of claim 11, wherein said microorganism is *Micrococcus glutamicus*.

13. The process of claim 12, wherein said hydrocarbon is kerosene.

References Cited

UNITED STATES PATENTS

| | | | |
|---|---|---|---|
| 3,220,929 | 11/1965 | Kinoshita et al. | 195—29 |
| 3,222,258 | 12/1965 | Iizuka et al. | 195—29 |
| 3,318,781 | 5/1967 | Hill | 195—28 |

OTHER REFERENCES

Shiio et al., Journal of General Applied Microbiology (Japan), vol. 9, No. 1, 1963, pp. 23 to 30.

LIONEL M. SHAPIRO, *Primary Examiner.*